(12) United States Patent
Kwon et al.

(10) Patent No.: US 7,853,087 B2
(45) Date of Patent: Dec. 14, 2010

(54) HIGH-SPEED BINARY IMAGE COMPRESSION METHOD

(75) Inventors: Jong-min Kwon, Suwon-si (KR); Eul-hwan Lee, Seongnam-si (KR)

(73) Assignee: Samsung Electronics Co., Ltd, Suwon-si (KR)

(*) Notice: Subject to any disclaimer, the term of this patent is extended or adjusted under 35 U.S.C. 154(b) by 1310 days.

(21) Appl. No.: 11/374,089

(22) Filed: Mar. 14, 2006

(65) Prior Publication Data

US 2007/0019867 A1      Jan. 25, 2007

(30) Foreign Application Priority Data

Jul. 25, 2005   (KR) ...................... 10-2005-0067547

(51) Int. Cl.
*G06K 9/36*        (2006.01)
(52) U.S. Cl. ..................................... 382/232
(58) Field of Classification Search ......... 382/232–251; 358/1.11–1.18, 426.01–426.16; 375/240.01–240.27
See application file for complete search history.

(56) References Cited

U.S. PATENT DOCUMENTS

RE37,272 E  *  7/2001  Ochi et al. .................. 358/1.15
6,343,157 B1 *  1/2002  Yada .......................... 382/246

FOREIGN PATENT DOCUMENTS

| JP | 10-191068 | 7/1998 |
| JP | 2001-238087 | 8/2001 |
| JP | 2003-069834 | 3/2003 |
| WO | WO 01/29771 A1 | 4/2001 |

* cited by examiner

*Primary Examiner*—Sherali Ishrat
(74) *Attorney, Agent, or Firm*—Stanzione & Kim LLP

(57) ABSTRACT

A high-speed binary image compression method, the method including calculating an estimation value of a current pixel based on a context value derived from neighboring pixels of the current pixel, determining whether a pixel value of the current pixel, the context value of the current pixel, and the estimation value of the current pixel are identical to one another, and determining whether the current pixel is a continuous pixel having a pixel value that is continuously identical to previous pixels input prior to the current pixel, determining whether the previous pixels are continuous pixels, if the current pixel is determined not to be continuous with the previous pixels, and coding the continuous pixels using a block unit having more than one pixel if the previous pixels are determined to be the continuous pixels, and determining block by block whether pixels input after the current pixel are continuous pixels if the current pixel is a continuous pixel, and coding the continuous pixels block by block. The method can enhance a coding speed by detecting and coding blocks each having continuous and identical pixel values in a binary image by the block unit.

12 Claims, 5 Drawing Sheets

HIGH-SPEED BINARY IMAGE COMPRESSION METHOD

CROSS-REFERENCE TO RELATED APPLICATIONS

This application claims the benefit under 35 U.S.C. §119(a) of Korean Patent Application No. 2005-67547, filed Jul. 25, 2005 in the Korean Intellectual Property Office, the entire contents of which are incorporated herein by reference.

BACKGROUND OF THE INVENTION

1. Field of the Invention

The present general inventive concept relates to a high-speed binary image compression method, and more particularly to a high-speed binary image compression method to detect and code blocks having continuously identical pixel values, block by block.

2. Description of the Related Art

There are a variety of binary image compression methods including a binary image compression method applied to the Joint Bi-level image expert group (JBIG). Existing still image coding methods contain Modified Huffman coding for one-dimensional coding, Modified READ coding for two-dimensional coding, etc., which are used for facsimile or hard-copy communications. However, these methods are not suitable for soft-copy transmissions for displaying images on a screen in applications such as image database searches performed by computers, video conferencing, etc. Therefore, JBIG was organized in the year of 1988 for standardization of coding schemes commonly available for the soft-copy and hard-copy communications, and was established in 1993.

A JBIG scheme enables hierarchical coding transmissions by first coding and transmitting a lowest-resolution image to enable users to know schematic content and then progressively increasing a resolution of the image. Further, the JBIG scheme can speed up search functions since it enables a wide range of resolutions to be displayed and enables direct searches to be performed based on reduced images on search systems.

FIG. 1 is a flow chart schematically illustrating a conventional binary image compression method.

In FIG. 1, a current pixel value PIX of a current pixel and an estimation value MPS of the current pixel calculated based on a context are compared (S111). The context is based on pixels around the current pixel, and the estimation value MPS can be calculated based on the context. That is, a context for certain pixels is calculated in advance, and a value of a pixel at which there exists an identical context value can be estimated as the value of the current pixel.

Further, values for ST, MPS, LPS, LPZ, NMPS, NLPS, etc., illustrated in FIG. 1, are calculated and stored in advance. MPS represents a value estimated in probability as a more probable symbol that corresponds to the estimation value of the current pixel, LPS represents a value opposite to a value estimated in probability as a less probable symbol, ST represents a state in a probability table, and LPZ represents a probability value of LPS. Further, NMPS represents a value indicating a next state when the estimation value MPS is right (i.e., MPS=PIX), and NLPS represents a value indicating a next state when the estimation value MPS is wrong (i.e., MPS does not equal PIX). Here, the values of MPS and LPS can vary depending on a value of SWITCH, which is a variable used in the compression method of FIG. 1.

In detail, out of black pixels, MPS represents a symbol with a black-pixel occurrence probability higher than 50%, if black MPS is set to 1 and white MPS is set to 0. ST is a value allocated based on the context, for which MPS and the current pixel substantially occurring are compared for probability estimation, a mapping probability value is obtained from a probability table, and a position for movement to a next state is stored in ST.

Variables A and C are compared with the stored values of ST, MPS, LPS, LPZ, NMPS, NLPS, etc., so that an execution routine is determined through conditional branching. Here, the variable A represents a probability interval register, and the variable C represents a variable keeping track of a code register pointing to a base of an interval of a symbol to occur. A compression rate is enhanced as an estimation value of MPS is closer to an actual pixel value. A code word C becomes identical as the estimation value of MPS is much closer to the actual pixel value, so coding data becomes reduced.

If the current pixel value PIX is the same as the estimation value of MPS of the current pixel in S111, S113 to S121 are executed for coding of the current pixel, and if the current pixel value is different from the estimation value of MPS of the current pixel, S123 to S133 are executed for coding of the current pixel.

If the current pixel value PIX is the same as the estimation value MPS of the current pixel, a new probability interval register A is calculated, and if the new probability interval register A is smaller than a certain size (0X8000), the new probability interval register A is re-adjusted and a compression result is output. However, if the current pixel value PIX is different from the estimation value MPS of the current pixel, the code register C pointing to the base of the interval of the symbol to occur is newly calculated, the registers A and C are re-adjusted, and the compression result is output.

The JBIG compression method described above has a slow execution speed due to pixel-by-pixel calculations. Therefore, a method is required to increase a compression speed by processing the repeated parts of images such as black spaces at one time.

SUMMARY OF THE INVENTION

The present general inventive concept provides a high-speed binary image compression method capable of enhancing a coding speed by detecting and coding blocks having continuous and identical pixel values from a binary image block by block.

Additional aspects of the present general inventive concept will be set forth in part in the description which follows and, in part, will be obvious from the description, or may be learned by practice of the general inventive concept.

The foregoing and other aspects of the present general inventive concept are achieved by providing a high-speed binary image compression method, the method including calculating an estimation value of a current pixel based on a context value derived from neighboring pixels of the current pixel, determining whether a pixel value of the current pixel, the context value of the current pixel, and the estimation value of the current pixel are identical to one another, and determining whether the current pixel is a continuous pixel having a pixel value that is continuously identical to previous pixels input prior to the current pixel, determining whether the previous pixels are continuous pixels if the current pixel is determined not to be continuous with the previous pixels, and coding the continuous pixels using a block unit having more than one pixel if the previous pixels are determined to be the continuous pixels, and determining block by block whether pixels input after the current pixel are continuous pixels if the current pixel is a continuous pixel, and coding the continuous pixels block by block.

The determining block by block of whether the pixels input after the current pixel are continuous pixels if the current pixel is a continuous pixel, and the coding of the continuous pixels block by block may include: if the current pixel is the continuous pixel, increasing a number of counted continuous pixels by one, determining whether the pixel value of the current pixel is "0", if the current pixel value is "0", calculating a sum of values of certain pixels that are continuous after the current pixel and a context value for the certain continuous pixels, and if the sum of the values of the certain pixels is "0", determining the certain pixels as the continuous pixels by determining that the values of all the certain pixels are "0", and if the current pixel value is not "0", calculating a sum of the values of the certain pixels and the context value for the certain pixels, and determining the certain pixels as the continuous pixels by determining all the certain pixel values as "1."

Further, if all the values of the certain pixels are not "0" or "1", the determining block by block whether the pixels input after the current pixel are continuous pixels if the current pixel is a continuous pixel, and the coding of the continuous pixels block by block may include determining that the certain pixels are not the continuous pixels.

If the current pixel is not the continuous pixel and the previous pixels are not the continuous pixels, then the determining of whether the previous pixels are continuous pixels if the current pixel is determined not to be continuous with the previous pixels, and the coding of the continuous pixels using the block unit having more than one pixel if the previous pixels are determined to be the continuous pixels may include coding the current pixel by the pixel unit.

The foregoing and other aspects of the present general inventive concept are also achieved by providing a method of compressing an image, the method including determining adjacent pixels in an image having continuous values, coding the adjacent pixels in the image having the continuous values in a block unit having more than one pixel, and coding adjacent pixels not having continuous values in a pixel unit.

The foregoing and other aspects of the present general inventive concept are also achieved by providing a method of compressing a binary image, the method including tracking a number of pixels that have continuous values with respect to one or more first pixel values, and determining whether a second pixel value is equal to the one or more first pixel values. When the second pixel value is not equal to the one or more first pixel values, coding the second pixel by pixel unit, coding the one or more first pixels by block unit if the one or more first pixel values include continuous pixel values, and coding the one or more first pixels by the pixel unit if the one or more first pixel values do not include continuous pixel values. When the second pixel value is equal to the one or more first pixel values, determining whether pixels following the second pixel have values that are continuous with the second pixel value by the block unit, block by block. When one or more block units of the pixels following the second pixel have values that are continuous with the second pixel value, coding the pixels having the continuous pixel values by the block unit, block by block, and when the one or more block units of the pixels following the second pixel do not have values that are continuous with the second pixel value, coding the one or more first pixels and the second pixel by block unit, block by block.

The foregoing and other aspects of the present general inventive concept are also achieved by providing a computer readable medium containing executable code to perform a method of compressing a binary image, the method including determining adjacent pixels in an image having continuous values, coding the adjacent pixels in the image having the continuous values in a block unit having more than one pixel, and coding adjacent pixels not having continuous values in a pixel unit.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
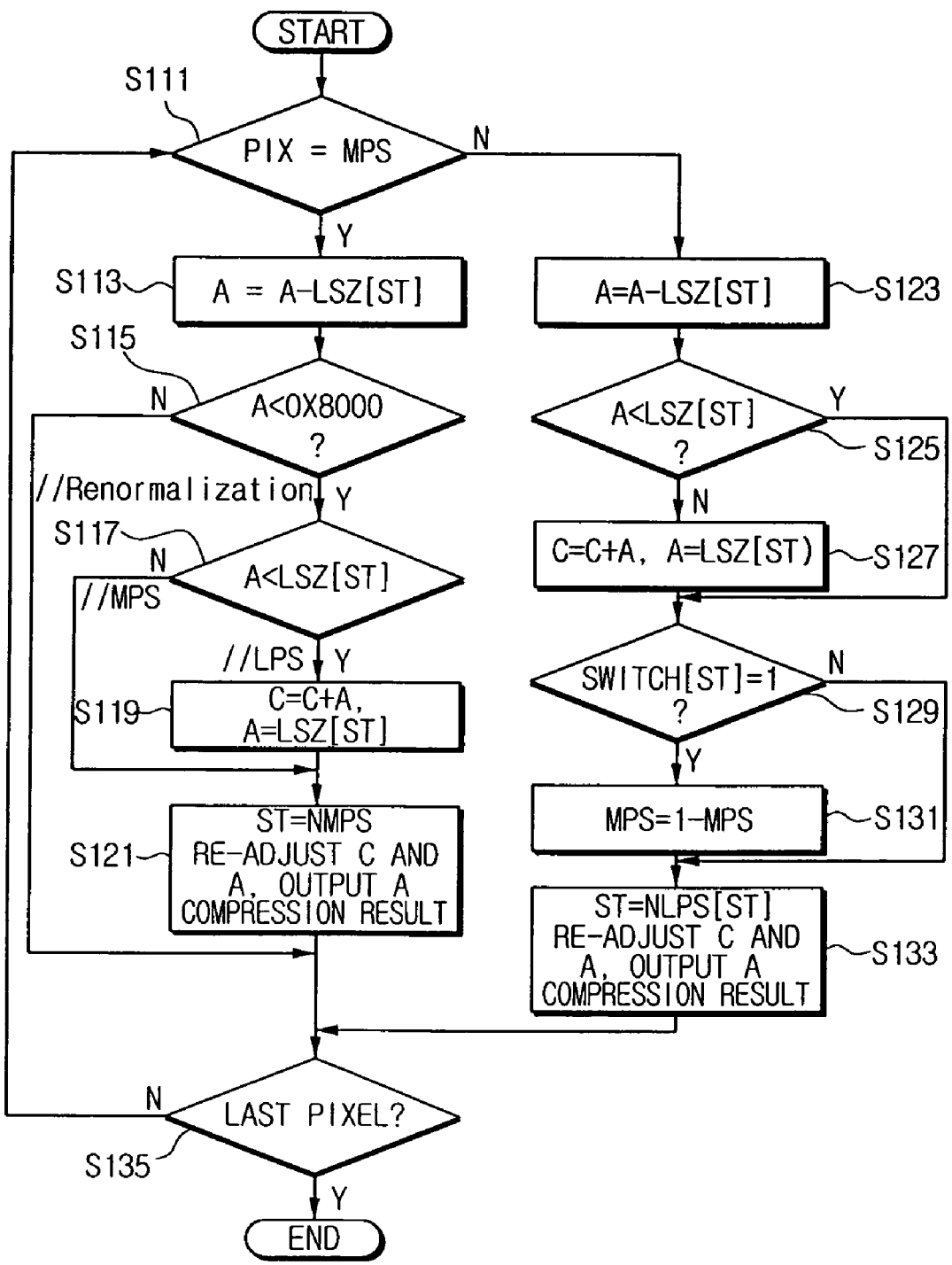
FIG. 1 is a flow chart schematically illustrating a conventional binary image compression method.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
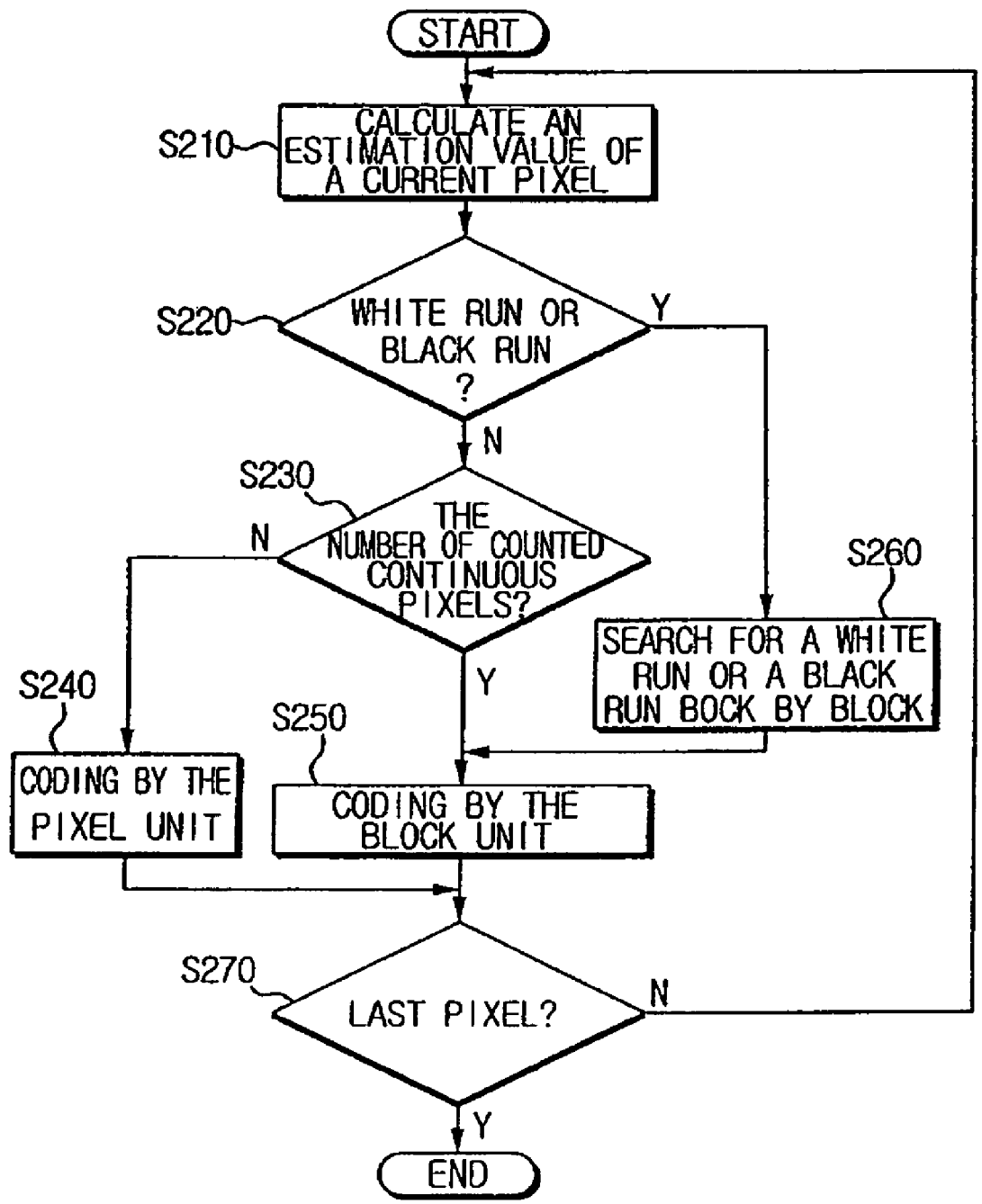
FIG. 2 is a flow chart illustrating a high-speed binary image compression method according to an embodiment of the present general inventive concept.

FIG. 2 is a flow chart illustrating a high-speed binary image compression method according to an embodiment of the present general inventive concept. The present general inventive concept can relate to a binary image compression method applied to the Joint Bi-level image expert group (JBIG) standard.

In FIG. 2, first, if a current pixel is input, an estimation value of the current pixel is calculated using a context value (operation S210). Here, the context value is a value calculated based on pixels around a predetermined pixel, and is calculated in advance. If a first context value calculated based on pixels around a first pixel is identical to a second context value calculated based on pixels around a second pixel, a first pixel value can be estimated as a second pixel value, and vice versa. Thus, the estimation value of the current pixel can be calculated based on a pixel value of the predetermined pixel having the same context value as a context value of the current pixel.

Next, it is determined whether the current pixel is a continuous pixel corresponding to a white run or a black run (operation S220). It is determined whether the current pixel corresponds to a white run or a black run based on the context value of the current pixel, the estimation value of the current pixel, and a current pixel value of the current pixel. It is determined whether the current pixel is a continuous pixel having a pixel value equal to previous pixels input continuously in time prior to the current pixel by determining whether one of the current pixel value, the context value of the current pixel, and the estimation value of the current pixel is equal to those of the previous pixels.

For example, if the value of the current pixel, the estimation value of the current pixel, and the context value of the current pixel are "0", respectively, the previous and current pixels are all white pixels, and correspond to a white run.

If it is determined that the current pixel is a continuous pixel having a pixel value identical to the previous pixels (i.e., a white run or a black run) in the operation S220, a white run or a black run is searched for block by block (i.e., block of pixels) (operation S260). If the current pixel is determined to be a continuous pixel and a white run or a black run exists, a white run or a black run is searched for block by block rather pixel by pixel.

Figure 3:
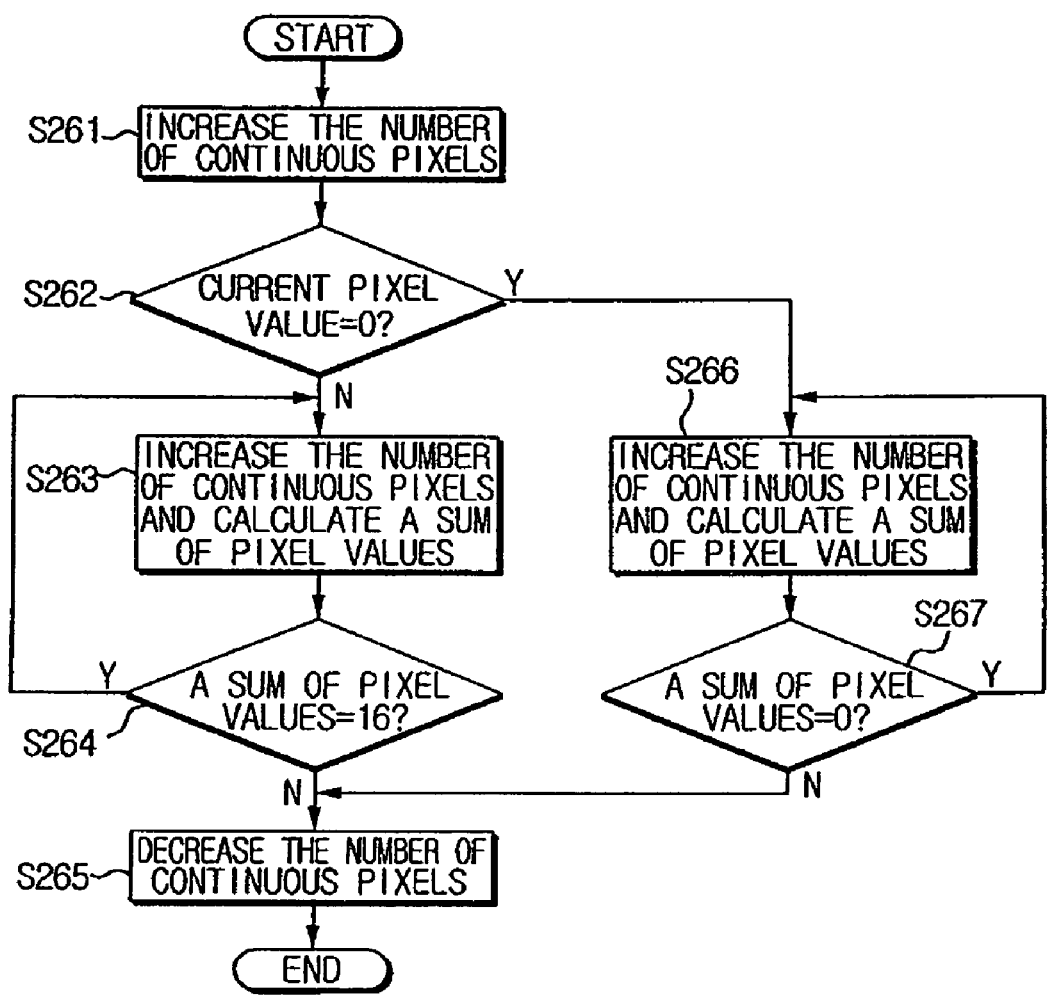
FIG. 3 is a flow chart illustrating a search process to search for white runs or black runs block by block in the high-speed binary image compression method of FIG. 2 according to an embodiment of the present general inventive concept.
Figure 4:
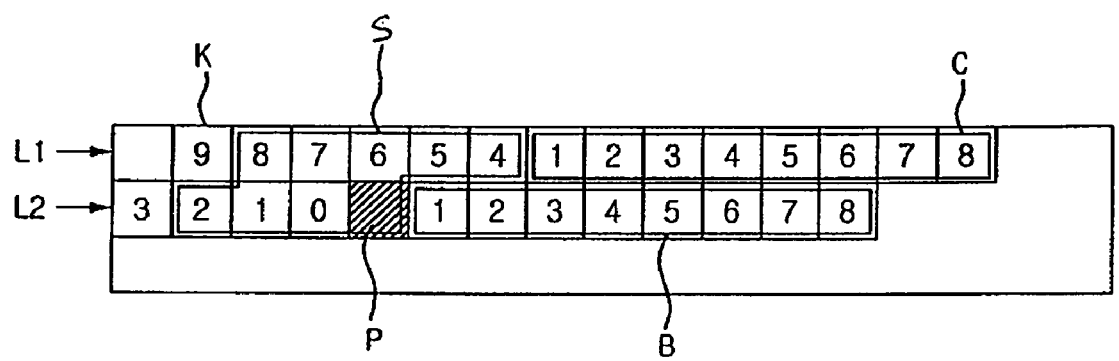
FIG. 4 is a view illustrating a calculation process to calculate a sum of pixel values in the process to search for white runs or black runs block by block of FIG. 3 according to an embodiment of the present general inventive concept.

FIG. 3 is a flow chart illustrating a searching process to perform searching block by block for a white run or a black run in the high-speed binary image compression method of FIG. 2. The searching process of FIG. 3 may correspond to the operation S260 of the method of FIG. 2. FIG. 4 is a view illustrating a calculation process to calculate a sum of pixel values in the searching process of FIG. 3. Hereinafter, the description will assume a block size of 8 bits by way of example. It should be understood that other block sizes may also be used. In particular, the block size can be scaled down to 4 bits, 2 bits, etc., or up to 16 bits, 32 bits, 128 bits, etc., depending on a user preference.

In FIG. 3, if the current pixel is determined to be a continuous pixel that corresponds to a white run or a black run in the operation S220, a number of counted continuous pixels is increased (incremented) (operation S261). That is, the current pixel is counted as a continuous pixel and one may be added to a variable that tracks the number of counted continuous pixels.

Next, it is determined whether the current pixel value is "0" (operation S262).

If the current pixel value is determined to be "0", the number of continuous pixels increases by a block size (e.g., 8 bits), and a sum of values of pixels grown to the block size from the current pixel and pixel values of a context for the pixels grown to the block size is calculated (operation S266).

In FIG. 4, P in a line L2 represents the current pixel, and K represents a context that corresponds to the current pixel P. Further, the pixels grown from the current pixel P to the block size of 8 bits correspond to a block B, and blocks S and C correspond to contexts for the grown pixels B. The grown pixels B also correspond to the previous pixels. However, the block C is a context for previous pixels B, and the block S is a context for the current pixel P and is a value calculated upon a determination (the operation S220 of FIG. 2) of whether the current pixel P corresponds to a continuous pixel. Thus, the grown pixels B and the context pixels C for the grown pixels are all 16 pixels. Next, it is determined whether a sum of the grown pixels B and the context C of the grown pixels B, that is, a sum of all 16 pixel values in the blocks B and C is "0" (operation S267). If the sum of the 16 pixel values is "0", it can be determined that all the 16 pixels have a white value. Thus, it is determined that all the pixels of the current pixel P, eight pixels followed by the current pixel P, and pixels followed by the eight pixels have a white value, and the operation S266 is repeated to increase the number of continuous pixels (i.e., the counted number of continuous pixels) by the block size (i.e., 8 bits) and to determine whether the pixels grown to the block size correspond to a white run.

However, if the value of the sum of the 16 pixels is not "0", it is determined that the pixels (i.e., the 16 pixels including the grown pixels B and the context pixels C of the grown pixels B) do not correspond to a white run, since all the previous pixels B followed by the current pixel P do not have a white value.

Thus, the number of continuous pixels which is increased by the number of pixels for a block from the current pixel P in the operation S266 is decreased (operation S265), and only the current pixel P is counted as a continuous pixel that corresponds to a white run such that the counted number of continuous pixels is increased by one instead of the block size.

Referring back to FIG. 3, if the current pixel is not "0" in the operation S262, the number of continuous pixels is increased by the block size in the same manner as in the operation S266, and a sum of values of pixels grown to the block size from the current pixel and values of pixels for a context for the grown pixels is calculated (operation S263) in the same manner as in the operation S266.

Next, it is determined whether a sum of values of the grown pixels and the pixels for the context for the grown pixels, that is, a sum of values of the 16 pixels is "16" (operation S264) in a similar manner as illustrated in FIG. 4. If the sum of the 16 pixels is "16", it can be determined that all the 16 pixels are black pixels (i.e., each of the 16 pixels has a bit value of "1" that indicates black). Thus, it is determined that all the pixels followed by eight pixels followed by the current pixel is a black run, and the operation S263 is repeated to increase the number of continuous pixels (i.e., the counted number of continuous pixels) by the block size again and to determine whether the pixels grown to the block size correspond to a black run.

However, if the sum of values of the 16 pixels is not "16", it is determined that all the pixels followed by the current pixel do not have a black value, that is, not a black run. Thus, the number of continuous pixels increased by the block size from the current pixel is decreased (operation S265), and only the current pixel is counted as a continuous pixel that corresponds to a black run such that the counted number of continuous pixels is increased by one. In other words, when it is determined that the current pixel is part of a white or black run at the operation S220 in FIG. 2 and the operation S262 in FIG. 3, the operation S260 (illustrated in FIGS. 3 and 4) searches the pixels that follow the current pixel, block by block, to determine whether the searched blocks are part of the determined white run or black run of which the current pixel is a part. The pixels that follow the current pixel that correspond to a block (and context values of the pixels in the block) are added together to determine whether the block is part of the determined white or black run. If the sum of the pixels is 0, the pixels are all white (the operation S267). If the sum of the pixels is equal to the number of pixels in the block (and the context values of the pixels in the block), the pixels are all black (the operation S264). If the sum of the pixels is between the number of pixels (and the context values of the pixels in the block) and "0," some of the pixels are black and some are white, and the block is not part of the determined run. When the pixels that follow the current pixel that correspond to the block are determined to correspond to the run, the number of continuous pixels can be incremented (i.e., increased) by the number of pixels in the block (the operations S264 and S267). When the pixels that follow the current pixel that correspond to the block are not all part of the run, the number of continuous pixels is only incremented by one, for the current pixel (the operation S265). Accordingly, the pixels in an image can be efficiently searched.

That is, if the increased continuous pixels followed by the current pixel do not correspond to a white run or a black run as a result of searches for whether the increased continuous pixels correspond to the white run or the black run, in the operation S265 the number of the increased continuous pixels is decreased and the previous pixel(s) leading up to and including the current pixel are counted as the white run or the black run.

Next, white-run pixels or black-run pixels as many as the number of decreased continuous pixels are coded block by block (operation 250).

However, if the current pixel is determined not to be a continuous pixel in the operation S220, it is determined whether counted continuous pixels exist (operation S230). That is, it is determined that whether counted continuous pixels exist among the previous pixels even though the current pixel is not a continuous pixel (i.e., whether the counted number of continuous pixels is greater than or equal to the block size, e.g., 8 bits). The determination of the operation 230 may be made by (1) determining whether the counted number of continuous pixels is two or more or (2) determining whether the counted number of continuous pixels is greater than or equal to the block size. In either case, more than one pixel can be coded for at a given time.

If no counted continuous pixels exist, the pixels are coded in a conventional manner pixel by pixel (operation S240), however if counted continuous pixels do exist (i.e., the counted pixels are greater than or equal to the block size), the previous pixels that are determined to be continuous pixels are coded block by block (operation S250). In other words, if no counted continuous pixels exist, the current pixels are coded pixel by pixel since the previous pixels prior to the current pixels can also be determined as pixels that do not correspond to a white run or a black run.

However, if counted continuous pixels are determined to exist even though the current pixel is determined not to be a continuous pixel having a pixel value equal to the previous pixels, the previous pixels prior to the current pixel can be determined to correspond to a white run or a black run. Therefore, as many white-run or black-run pixels as the counted continuous pixels are coded block by block in the operation S250. In operation 270, if a last pixel has been coded, the high-speed binary compression method of FIG. 2 is complete.

Figure 5:
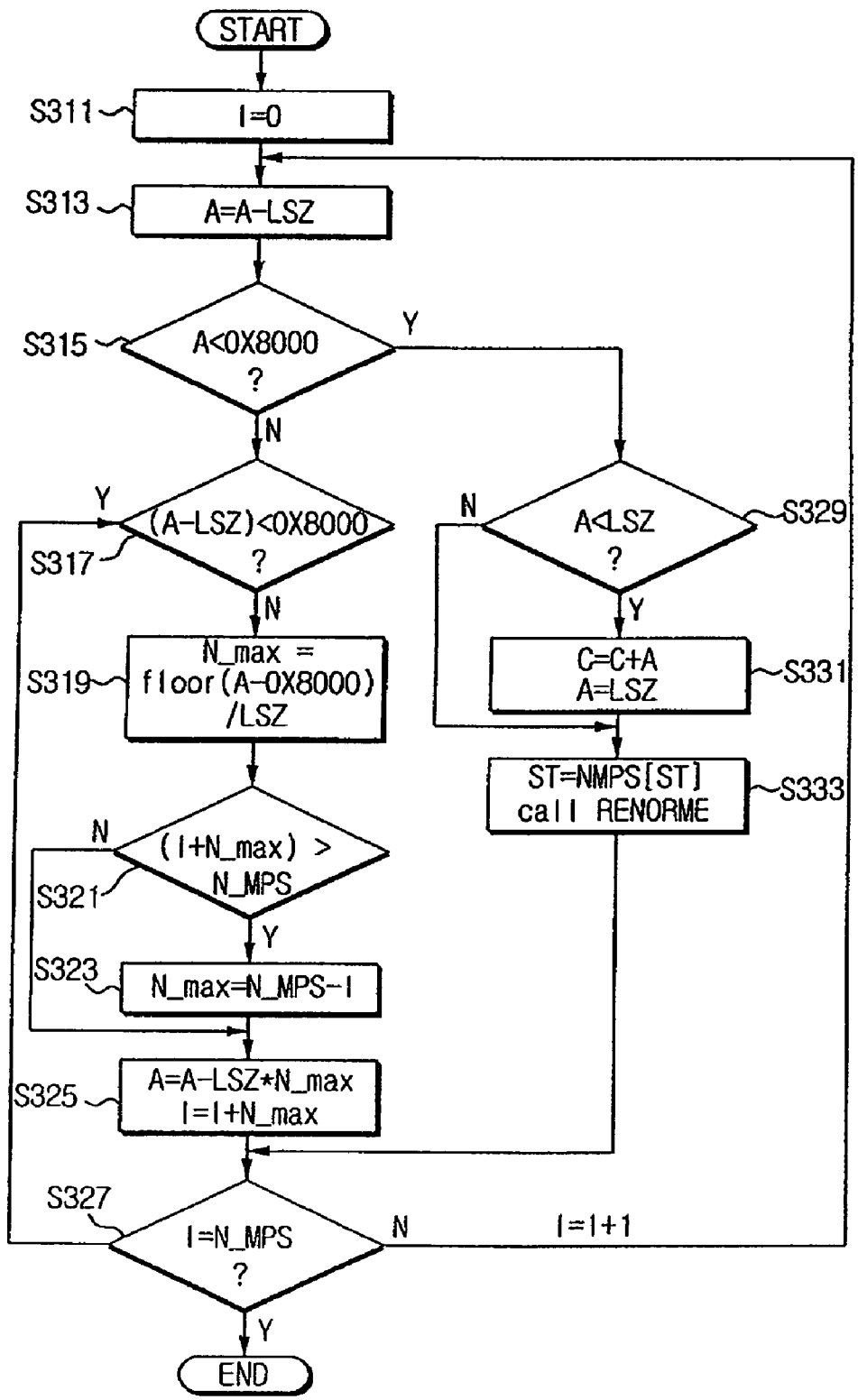
FIG. 5 is a flow chart illustrating a process to code a binary image block by block according to an embodiment of the present general inventive concept.

FIG. 5 is a flow chart illustrating a block-by-block coding process according to an embodiment of the present general inventive concept. The block-by-block coding process of FIG. 5 may correspond to the operation S250 of the high-speed binary image compression method of FIG. 2. In FIG. 5, A represents a probability interval register, and C represents a variable that keeps track of a code register pointing to the base of an interval of a symbol to occur. Further, MPS represents a value estimated in probability as a more probable symbol (i.e., probability of the more probable of white or black), LPS represents a value opposite to a value estimated in probability as a less probable symbol. LPZ represents a probability value of LPS, and ST is a state in a probability table. Further, NMPS represents a value indicating a next state when an estimation value MPS is accurate, NLPS represents a value indicating a next state when an estimation value MPS is inaccurate, and N_MPS represents the number of continuous pixels (i.e., the counted number of continuous pixels).

In FIG. 5, if pixels are input, a number of pixels is counted using a variable I. First, the count variable I is initialized (I=0) (operation S311), and the probability interval register A is adjusted (operation S313).

Next, it is determined whether the adjusted probability interval register A is less than 0x8000 (operation S315).

If the adjusted probability register A is less than 0x8000, operations S329 to S333 are performed. That is, if the adjusted probability register A is less than 0x8000, a function RENORME is performed to adjust values of the variable that keeps track of the code register pointing to the base of the interval of the symbol to occur C and the adjusted probability register A, to update a state ST, and to create a code word.

Alternatively, if the adjusted probability register A is greater than 0x8000, operations S317 to S325 are performed. That is, if the adjusted probability register A is greater than 0x8000, continuous pixels are processed by the block unit at one time. In particular, the number of pixels to be processed at the one time is calculated in the operation S319, and thee pixels that are available for processing are coded at the one time in the operations S321 to S325.

Further, it is determined whether all the continuous pixels are coded upon coding by the block unit (operation S327). If all the continuous pixels are not coded, the operation S313 is repeated for coding.

The embodiments of the present general inventive concept can be embodied as computer readable codes on a computer readable recording medium. The computer readable recording medium may include any data storage device that can store data which can be thereafter read by a computer system. Examples of the computer readable recording medium include a read-only memory (ROM), a random-access memory (RAM), CD-ROMs, magnetic tapes, floppy disks, and optical data storage devices. The computer readable recording medium can also be distributed over network coupled computer systems so that the computer readable code is stored and executed in a distributed fashion. The embodiments of the present general inventive concept may also be embodied in hardware or a combination of hardware and software.

As described above, the various embodiments of the present general inventive concept can enhance a coding speed by detecting and coding blocks each having continuous and identical pixel values in a binary image using a block unit.

Further, even though continuous pixels having continuous and identical pixel values are detected, the various embodiments of the present general inventive concept can also enhance a coding speed by detecting whether the pixels are block by block continuous.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A high-speed binary image compression method, the method comprising:
    calculating an estimation value of a current pixel based on a context value derived from neighboring pixels of the current pixel;
    determining whether a pixel value of the current pixel, the context value of the current pixel, and the estimation value of the current pixel are identical to one another, and determining whether the current pixel is a continuous pixel having a pixel value that is continuously identical to previous pixels input prior to the current pixel;
    determining whether the previous pixels are continuous pixels if the current pixel is determined not to be continuous with the previous pixels, and coding the continuous pixels using a block unit having more than one pixel if the previous pixels are determined to be the continuous pixels; and
    determining block by block whether pixels input after the current pixel are continuous pixels if the current pixel is a continuous pixel, and coding the continuous pixels block by block.

2. The high-speed binary image compression method as claimed in claim 1, wherein the determining block by block of whether the pixels input after the current pixel are continuous if the current pixel is a continuous pixel, and the coding of the continuous pixels block by block comprises:

if the current pixel is the continuous pixel,
increasing a number of counted continuous pixels by one;
determining whether the pixel value of the current pixel is "0";
if the current pixel value is "0", calculating a sum of values of certain pixels that are continuous after the current pixel and a context value for the certain continuous pixels, and if the sum of the values of the certain pixels is "0", determining the certain pixels as the continuous pixels by determining that the values of all the certain pixels are "0"; and
if the current pixel value is not "0", calculating a sum of the values of the certain pixels and the context value for the certain pixels, and determining the certain pixels as the continuous pixels by determining all the certain pixel values as "1."

3. The high-speed binary image compression method as claimed in claim 2, wherein, if all the values of the certain pixels are not one of "0" and "1", the determining block by block of whether the pixels input after the current pixel are continuous if the current pixel is a continuous pixel, and the coding of the continuous pixels block by block comprises determining that the certain pixels are not the continuous pixels.

4. The high-speed binary image compression method as claimed in claim 1, wherein, if the current pixel is not the continuous pixel and the previous pixels are not the continuous pixels, the coding of the continuous pixels using the block unit having more than one pixel if the previous pixels are determined to be the continuous pixels comprises coding the current pixel using a pixel unit.

5. A method of compressing an image, the method comprising:

determining adjacent pixels in an image having continuous values;
coding the adjacent pixels in the image having the continuous values in a block unit having more than one pixel;
coding adjacent pixels not having continuous values in a pixel unit,
wherein the determining of adjacent pixels having continuous values comprises:
determining whether a current pixel has a value that is equal to a value of one or more previous pixels;
if the current pixel value is equal to the value of the one or more previous pixels, searching pixels following the current pixel by the block unit to determine whether the pixels in the block unit that follows the current pixel have continuous values with respect to the one or more previous pixels; and
counting a number of pixels having the continuous value, and
wherein the searching of the pixels following the current pixel comprises:
adding pixels values of the pixels in the block unit and context values of the pixels in the block unit to determine whether a sum thereof equals "0" to indicate a white run or whether the sum equals a number of the pixels in the block unit and a number of context values of the pixels in the block unit to indicate a white run.

6. The method as claimed in claim 5, wherein the coding of the adjacent pixels in the image having the continuous values in the block unit having more than one pixel comprises:

determining whether the counted number of pixels having the continuous value is greater than or equal to the number of pixels of the block unit;
coding the pixels that correspond to the counted number of pixels having the continuous value by the block unit when it is determined that the counted number of pixels having the continuous value is greater than or equal to the number of pixels of the block unit; and
coding the pixels that correspond to the counted number of pixels having the continuous value by the pixel unit when it is determined that the counted number of pixels having the continuous value is less than the number of pixels of the block unit or when it is determined that the current pixel value is not equal to the values of the one or more previous pixels.

7. The method as claimed in claim 5, wherein the determining of whether the current pixel has a value that is equal to the value of one or more previous pixels comprises:

calculating an estimated value of the current pixel based on a context value thereof and a context value of another pixel; and
determining whether the current pixel has a continuous value with the one or more previous pixels by determining whether one of the estimated value of the current pixel, the context value of the current pixel, and the current pixel value is equal to an estimated value of the one or more previous pixels, a context value of the one or more previous pixels, and a value of the one or more previous pixels.

8. The method as claimed in claim 5, wherein the determining of whether the current pixel has a value that is equal to the value of one or more previous pixels comprises:

determining whether an estimated value of the current pixel, a context value of the current pixel, and a value of the current pixel are equal to each other.

9. The method as claimed in claim 5, wherein the method is a JBIG high speed compression method.

10. A non-transitory computer readable medium containing executable code to perform a method of compressing a binary image, the method comprising:

determining adjacent pixels in an image having continuous values;
coding the adjacent pixels in the image having the continuous values in a block unit having more than one pixel; and
coding adjacent pixels not having continuous values in a pixel unit,
wherein the determining of the adjacent pixels having continuous values comprises:
determining whether a current pixel has a value that is equal to a value of one or more previous pixels;
searching pixels following the current pixel by the block unit to determine whether the pixels in the block unit that follows the current pixel have continuous values with respect to the one or more previous pixels if the current pixel value is equal to the value of the one or more previous pixels; and
counting a number of pixels having the continuous value,
wherein the searching of the pixels following the current pixel comprises:

adding pixels values of the pixels in the block unit and context values of the pixels in the block unit to determine whether a sum thereof equals "0" to indicate a white run or whether the sum equals a number of the pixels in the block unit and a number of context values of the pixels in the block unit to indicate a white run.

11. The medium as claimed in claim 10, wherein the coding of the pixels in the image having the continuous values in the block unit having more than one pixel comprises:

determining whether the counted number of pixels having the continuous value is greater than or equal to the number of pixels of the block unit;

coding the pixels that correspond to the counted number of pixels having the continuous value by the block unit when it is determined that the counted number of pixels having the continuous value is greater than or equal to the number of pixels of the block unit; and coding the pixels that correspond to the counted number of pixels having the continuous value by the pixel unit when it is determined that the counted number of pixels having the continuous value is less than the number of pixels of the block unit or when it is determined that the current pixel value is not equal to the values of the one or more previous pixels.

12. The medium as claimed in claim 10, wherein the determining of whether the current pixel has a value that is equal to the value of one or more previous pixels comprises determining whether an estimated value of the current pixel, a context value of the current pixel, and a value of the current pixel are equal to each other.

* * * * *